(No Model.)
J. C. RAYMOND.
BICYCLE.
No. 592,169. Patented Oct. 19, 1897.
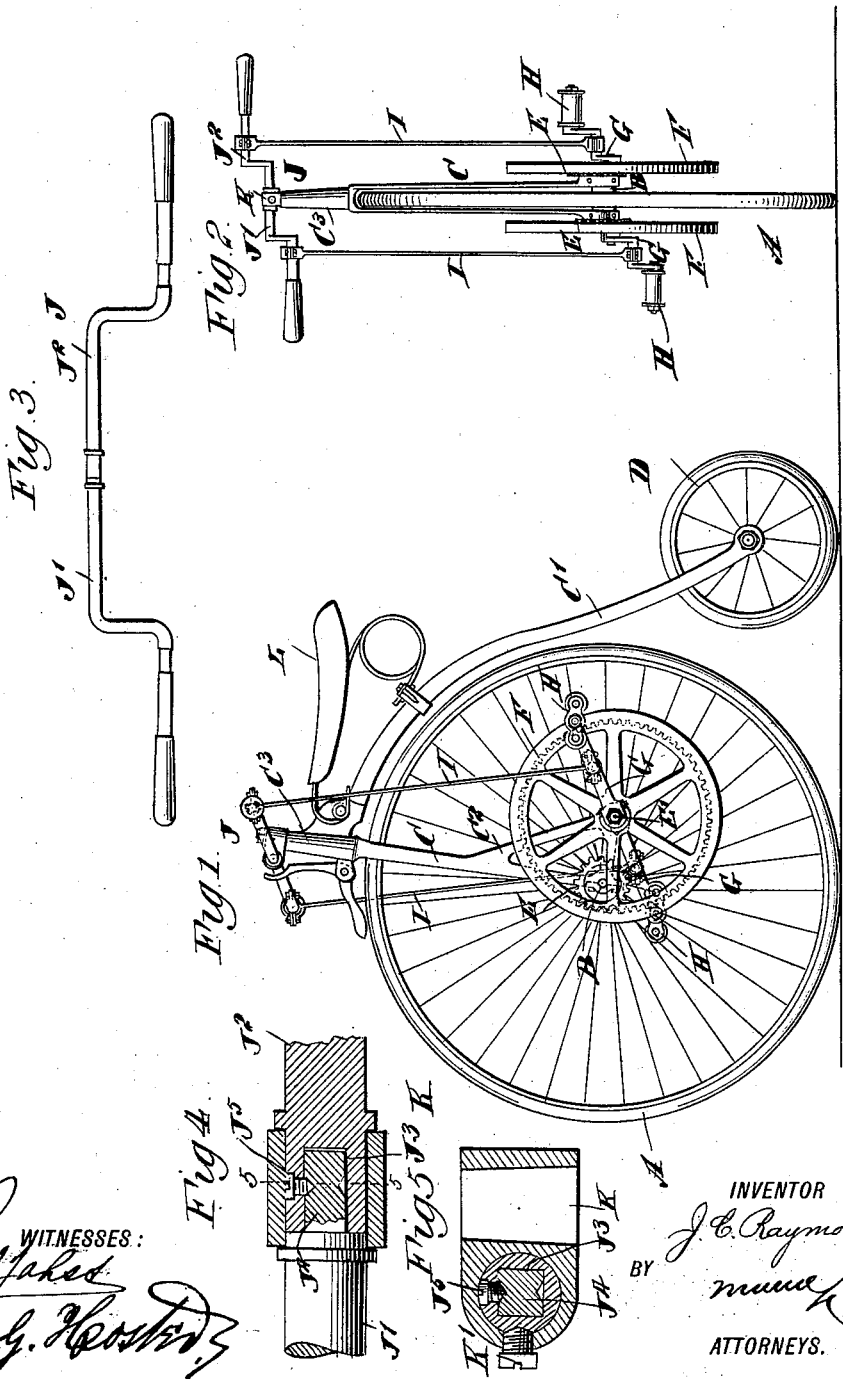
WITNESSES:
INVENTOR
J. C. Raymond.
BY
ATTORNEYS.
THE NORRIS PETERS CO., PHOTO-LITHO., WASHINGTON, D. C.

UNITED STATES PATENT OFFICE.

JOHN CARLYLE RAYMOND, OF NEW YORK, N. Y.

BICYCLE.

SPECIFICATION forming part of Letters Patent No. 592,169, dated October 19, 1897.

Application filed October 29, 1896. Serial No. 610,424. (No model.)

*To all whom it may concern:*

Be it known that I, JOHN CARLYLE RAYMOND, of New York city, in the county and State of New York, have invented a new and Improved Bicycle, of which the following is a full, clear, and exact description.

The object of the invention is to provide a new and improved bicycle which is simple and durable in construction, and arranged to enable the rider to conveniently steer the machine and drive it at a high rate of speed.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement. Fig. 2 is an end view of the same. Fig. 3 is a plan view of the combination handle-bar and handle-crank. Fig. 4 is an enlarged sectional side elevation of the joint for the handle-bar sections, and Fig. 5 is a cross-section of the same on the line 5 5 of Fig. 4.

The bicycle, as shown in Figs. 1 and 2, is provided with a drive-wheel A, the axle or shaft B of which is journaled in suitable bearings in a fork C, provided with a rearward extension C', carrying a guide-wheel D. On the axle or shaft B are secured the pinions E in mesh with internal gear-wheels F, journaled independently of one another, by having their shafts E' mounted to rotate in suitable brackets $C^2$, extending from the members of the fork C.

On each of the shafts E' is secured a crank G, carrying at its outer end a pedal H, and each crank G is pivotally connected by a link I with a combination handle-bar and handle-crank J, held at its middle on a bracket K, secured to the steering-head $C^3$ of the bicycle-frame. The combination handle-bar and handle-crank is mounted to turn at its middle in the bracket K and is preferably made in sections J' $J^2$, standing diametrically opposite each other when the links I are used for connecting the handle-crank with the cranks G, used for turning the internal gear-wheels F.

Now it will be seen that by the arrangement described, the rider seated on the seat L can use his feet on the pedals H, to turn the cranks G and internal gear-wheels F, so as to cause the latter to rotate the pinions E, and consequently the shaft B and drive-wheel A. The rider can also turn the handle-crank J in its bearing in the bracket K, so that the motion of the handle-crank is transmitted by the links I to the cranks G, to assist in turning the latter, to drive the wheel as above mentioned. Thus the rider can use both hands and feet for propelling the machine forward. The handle-crank J can also be used for steering the machine by manipulating the handle-crank accordingly, and turning the steering-post in the steering-head $C^3$ and carrying the fork C.

When the rider desires to use the pedals H only, and not the handle-crank for assisting in the propulsion of the wheel, then the links I are disconnected from the cranks G and sections J' and $J^2$ of the handle-crank J. The sections J' and $J^2$ are now placed in alinement with each other, as indicated in Fig. 3, to be used only as an ordinary handle-bar.

In order to permit of conveniently changing the relative positions of the sections J' $J^2$, I provide the inner end of the section $J^2$ with a square recess $J^3$, adapted to be engaged by a square offset $J^4$ on the inner end of the other section J'. A set-screw $J^5$ serves to fasten the offset $J^4$ in place on the section $J^2$, as is plainly indicated in Fig. 4. The handle-bar J can be fastened in place at its joint in the bracket K by a set-screw K' whenever the bar is to be used only as a handle-bar; but when it is used as a handle-crank the set-screw K' is unscrewed to permit of turning the bar in the bracket K. For changing the positions of the sections it is necessary to turn the bar so as to bring the set-screw $J^5$ into the opening for the set-screw K', to permit of removal by unscrewing the set-screw $J^5$ and pulling the reduced end $J^4$ out of the opening $J^3$. A half-turn given to the section J' brings its handle end in alinement with the handle end of the other section $J^2$, and the parts are again fastened together while in this position by screwing up the set-screw $J^5$ and then turning the bar J to the desired position, and then using the set-screw K' to fasten the handle bar in place in the bracket K.

It will be seen that by the arrangement described the rider can conveniently steer the machine and drive it at a very high rate of speed without overexerting himself. It will further be seen that the bar J can be used as a rigid handle-bar on the steering-post, or as a combination handle-bar and handle-crank for assisting in the propulsion of the wheel and the steering of the same, as above explained.

Having thus fully described my invention, I claim as new and desire to secure by Letters Patent—

1. The combination with the front fork, a drive-wheel mounted in the fork, and a pinion on each end of the shaft of the drive-wheel, of internal gear-wheels mounted on the fork and meshing with the said pinions, crank-arms on the gear-wheels and carrying pedals on their outer ends, a combined handle-bar and handle-crank mounted in a socket carried by the steering-head, and formed of two crank-sections adjustably secured together, whereby the sections can be held diametrically opposite each other or in alinement, and links detachably secured to the crank of the internal gear-wheel and to the sections of the handle-bar, substantially as described.

2. A combined bicycle-handle and handle-crank, consisting of two crank-sections, one provided with a longitudinally-extending angular socket in its inner end and the other with a correspondingly-shaped inner end fitting in the socket, and a screw projecting into the socket and engaging the end of the section in the socket to lock it therein, substantially as described.

3. The combination with a bracket adapted to be secured to the steering-head of a bicycle and provided with a bearing, of a handle-bar mounted in the bearing and held therein by a set-screw, said handle-bar being formed of two crank-sections each provided with a collar, one section having a longitudinally-extending angular socket in its inner end and the other a correspondingly-shaped end fitting in the socket, and a set-screw projecting into the socket into engagement with the end of the section in said socket, substantially as described.

JOHN CARLYLE RAYMOND.

Witnesses:
    THEO. G. HOSTER,
    JAMES M. HENLEY.